US012579266B2

(12) United States Patent
Chen et al.

(10) Patent No.: US 12,579,266 B2
(45) Date of Patent: *Mar. 17, 2026

(54) RANSOMWARE INFECTION DETECTION IN FILESYSTEMS

(71) Applicant: Rubrik, Inc., Palo Alto, CA (US)

(72) Inventors: Oscar Chen, Palo Alto, CA (US); Di Wu, Newark, CA (US); Benjamin Reisner, San Francisco, CA (US); Matthew Edward Noe, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/327,792

(22) Filed: Sep. 12, 2025

(65) Prior Publication Data

US 2026/0010626 A1 Jan. 8, 2026

Related U.S. Application Data

(63) Continuation of application No. 18/458,466, filed on Aug. 30, 2023, which is a continuation of application
(Continued)

(51) Int. Cl.
G06F 21/56 (2013.01)
G06F 11/14 (2026.01)
(Continued)

(52) U.S. Cl.
CPC ........ G06F 21/565 (2013.01); G06F 11/1458 (2013.01); G06F 16/128 (2019.01);
(Continued)

(58) Field of Classification Search
USPC .......................................................... 726/23
See application file for complete search history.

(56) References Cited

U.S. PATENT DOCUMENTS 6,671,811 B1 * 12/2003 Diep ..................... G06F 21/552
714/33
7,181,768 B1 2/2007 Ghosh et al.
(Continued)

FOREIGN PATENT DOCUMENTS

CA 2984007 A1 4/2018
CN 101512522 A 8/2009
(Continued)

OTHER PUBLICATIONS

International Preliminary Report on Patentability received for PCT Patent Application No. PCT/US19/43563, mailed on Feb. 11, 2021, 8 pages.
(Continued)

*Primary Examiner* — Sakinah White Taylor
(74) *Attorney, Agent, or Firm* — Holland & Hart LLP

(57) ABSTRACT

Described herein is a system that detects ransomware infection in filesystems. The system detects ransomware infection by using backup data of machines. The system detects ransomware infection in two stages. In the first stage, the system analyzes a filesystem's behavior. The filesystem's behavior can be obtained by loading the backup data and crawling the filesystem to create a filesystem metadata including information about file operations during a time interval. The filesystem determines a pattern of the file operations and compares the pattern to a normal patter to analyze the filesystem's behavior. If the filesystem's behavior is abnormal, the system proceeds to the second stage to analyze the content of the files to look for signs of encryption in the filesystem. The system combines the analysis of both stages to determine whether the filesystem is infected by ransomware.

20 Claims, 5 Drawing Sheets

Related U.S. Application Data

No. 17/370,203, filed on Jul. 8, 2021, now Pat. No. 11,783,036, which is a continuation of application No. 16/049,574, filed on Jul. 30, 2018, now Pat. No. 11,120,131.

(51) Int. Cl.
  *G06F 11/1446* (2026.01)
  *G06F 16/11* (2019.01)

(52) U.S. Cl.
  CPC ........ *G06F 11/1469* (2013.01); *G06F 21/568* (2013.01); *G06F 2201/84* (2013.01); *G06F 2221/034* (2013.01)

(56) References Cited

U.S. PATENT DOCUMENTS

| | | | |
|---|---|---|---|
| 7,765,217 | B2 | 7/2010 | Yamakawa et al. |
| 7,802,300 | B1 | 9/2010 | Liu et al. |
| 7,934,103 | B2 | 4/2011 | Kidron |
| 7,941,855 | B2 | 5/2011 | Sung et al. |
| 7,962,956 | B1 | 6/2011 | Liao et al. |
| 9,116,722 | B2 | 8/2015 | Shenfield et al. |
| 9,516,053 | B1 | 12/2016 | Muddu et al. |
| 9,678,981 | B1 * | 6/2017 | Taylor ................... G06F 16/182 |
| 9,734,337 | B1 | 8/2017 | Patton et al. |
| 9,779,240 | B2 | 10/2017 | Feroz et al. |
| 10,032,033 | B2 | 7/2018 | Gu et al. |
| 10,073,856 | B1 * | 9/2018 | Cooper ............... G06F 16/1844 |
| 10,133,866 | B1 | 11/2018 | Kumar et al. |
| 10,229,269 | B1 | 3/2019 | Patton et al. |
| 10,230,745 | B2 * | 3/2019 | Singh .................. H04L 63/1491 |
| 10,572,993 | B2 | 2/2020 | Tanaka et al. |
| 10,609,066 | B1 | 3/2020 | Nossik et al. |
| 10,839,072 | B2 * | 11/2020 | Pohl ...................... G06F 3/0683 |
| 10,867,040 | B2 | 12/2020 | Gibbons et al. |
| 10,929,031 | B2 | 2/2021 | Sapuntzakis et al. |
| 10,992,699 | B1 | 4/2021 | Sites et al. |
| 11,086,987 | B2 | 8/2021 | Brown |
| 11,120,131 | B2 | 9/2021 | Chen et al. |
| 11,146,581 | B2 | 10/2021 | Lotem et al. |
| 11,170,104 | B1 | 11/2021 | Stickle et al. |
| 11,449,607 | B2 | 9/2022 | Annen et al. |
| 11,522,889 | B2 | 12/2022 | Annen et al. |
| 11,606,379 | B1 | 3/2023 | Pratt et al. |
| 11,657,152 | B2 | 5/2023 | Kraemer et al. |
| 11,770,391 | B1 | 9/2023 | Bakthavatchalam et al. |
| 2004/0111632 | A1 * | 6/2004 | Halperin ............. H04L 41/0631 709/224 |
| 2006/0074824 | A1 | 4/2006 | Li |
| 2008/0010683 | A1 | 1/2008 | Baddour et al. |
| 2008/0127346 | A1 | 5/2008 | Oh et al. |
| 2008/0209138 | A1 | 8/2008 | Sheldon et al. |
| 2009/0055604 | A1 | 2/2009 | Lemar et al. |
| 2010/0125911 | A1 | 5/2010 | Bhaskaran |
| 2013/0305373 | A1 | 11/2013 | Lim et al. |
| 2014/0013434 | A1 | 1/2014 | Ranum et al. |
| 2015/0106652 | A1 | 4/2015 | Mei et al. |
| 2015/0172300 | A1 | 6/2015 | Cochenour |
| 2015/0264077 | A1 | 9/2015 | Berger et al. |
| 2016/0012227 | A1 | 1/2016 | Tuvell et al. |
| 2016/0239661 | A1 | 8/2016 | Kawauchi |
| 2016/0292418 | A1 | 10/2016 | Wojnowicz et al. |
| 2017/0053118 | A1 | 2/2017 | Malkov et al. |
| 2017/0063906 | A1 | 3/2017 | Muddu et al. |
| 2017/0103334 | A1 | 4/2017 | Gusev et al. |
| 2017/0140156 | A1 | 5/2017 | Gu et al. |
| 2017/0177867 | A1 | 6/2017 | Crofton et al. |
| 2017/0180394 | A1 | 6/2017 | Crofton et al. |
| 2017/0195353 | A1 | 7/2017 | Taylor et al. |
| 2017/0214708 | A1 | 7/2017 | Gukal et al. |
| 2017/0315979 | A1 | 11/2017 | Boucher et al. |
| 2017/0339178 | A1 | 11/2017 | Mahaffey et al. |
| 2018/0034835 | A1 | 2/2018 | Iwanir et al. |
| 2018/0121650 | A1 | 5/2018 | Brown |
| 2018/0173874 | A1 | 6/2018 | Muttik et al. |
| 2018/0211039 | A1 | 7/2018 | Tamir et al. |
| 2018/0307839 | A1 | 10/2018 | Bhave et al. |
| 2019/0012458 | A1 | 1/2019 | Fausak et al. |
| 2019/0042744 | A1 | 2/2019 | Rajasekharan et al. |
| 2019/0163763 | A1 | 5/2019 | Pandey et al. |
| 2019/0171966 | A1 | 6/2019 | Rangasamy |
| 2019/0235973 | A1 | 8/2019 | Brewer et al. |
| 2019/0236272 | A1 | 8/2019 | Piatt |
| 2019/0251259 | A1 | 8/2019 | Stepanek et al. |
| 2019/0286534 | A1 | 9/2019 | O'Mahony et al. |
| 2019/0332766 | A1 | 10/2019 | Guri et al. |
| 2019/0332769 | A1 | 10/2019 | Fralick et al. |
| 2019/0347418 | A1 | 11/2019 | Strogov et al. |
| 2019/0347578 | A1 | 11/2019 | Bolding et al. |
| 2019/0354850 | A1 | 11/2019 | Watson et al. |
| 2020/0004808 | A1 | 1/2020 | Yao et al. |
| 2020/0004962 | A1 | 1/2020 | Araujo et al. |
| 2020/0042703 | A1 | 2/2020 | Herman et al. |
| 2020/0076812 | A1 | 3/2020 | Spurlock et al. |
| 2020/0089886 | A1 | 3/2020 | Oetken |
| 2020/0177612 | A1 | 6/2020 | Kras et al. |
| 2020/0279043 | A1 | 9/2020 | Thornton et al. |
| 2020/0311595 | A1 | 10/2020 | Chen et al. |
| 2020/0342652 | A1 | 10/2020 | Rowell et al. |
| 2021/0034994 | A1 | 2/2021 | Stocker et al. |
| 2021/0044604 | A1 | 2/2021 | Annen et al. |
| 2021/0089957 | A1 | 3/2021 | Ermans et al. |
| 2021/0374027 | A1 | 12/2021 | Joglekar et al. |
| 2022/0247766 | A1 | 8/2022 | Annen et al. |
| 2022/0318203 | A1 | 10/2022 | Kotwal et al. |
| 2023/0004749 | A1 | 1/2023 | Jaganathan et al. |
| 2023/0026368 | A1 | 1/2023 | Silverstein |
| 2023/0105500 | A1 | 4/2023 | Annen et al. |
| 2024/0430278 | A1 | 12/2024 | Tyborowski et al. |

FOREIGN PATENT DOCUMENTS

| | | | | |
|---|---|---|---|---|
| CN | 102799500 | A | 11/2012 | |
| CN | 106845223 | A | 6/2017 | |
| EP | 3374922 | B1 | 8/2019 | |
| KR | 10-1772439 | B1 | 8/2017 | |
| KR | 10-1828600 | B1 | 3/2018 | |
| WO | WO-2005047862 | A2 * | 5/2005 | .......... G06F 21/552 |
| WO | 2020/028152 | A1 | 2/2020 | |

OTHER PUBLICATIONS

International Search Report and Written Opinion received for PCT Patent Application No. PCT/US19/43563, mailed on Oct. 29, 2019, 9 pages.

* cited by examiner

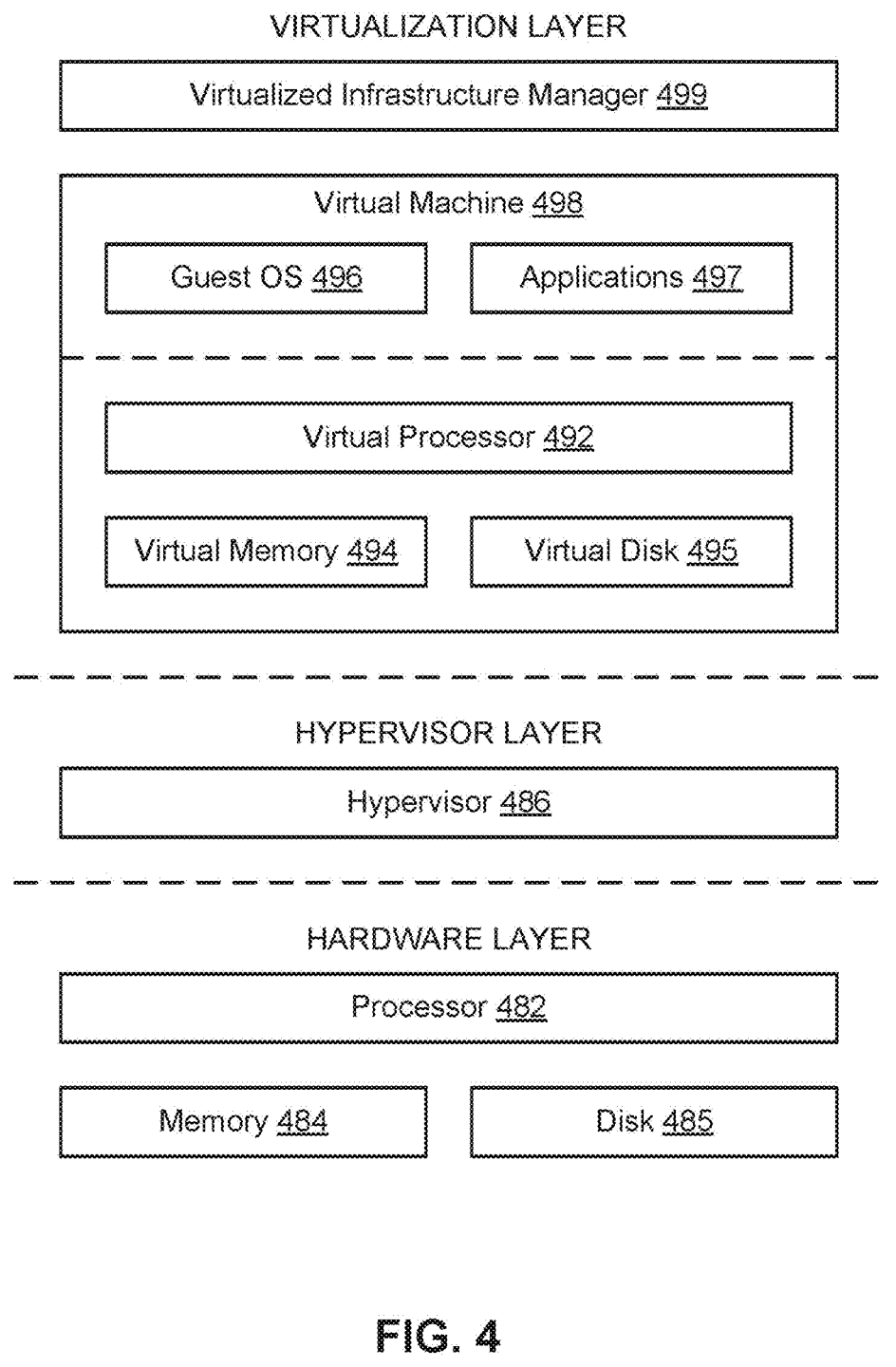

VIRTUALIZATION LAYER

Virtualized Infrastructure Manager 499

Virtual Machine 498

Guest OS 496

Applications 497

Virtual Processor 492

Virtual Memory 494

Virtual Disk 495

HYPERVISOR LAYER

Hypervisor 486

HARDWARE LAYER

Processor 482

Memory 484

Disk 485

FIG. 4

RANSOMWARE INFECTION DETECTION IN FILESYSTEMS

CROSS REFERENCE

The present Application for Patent is a Continuation of U.S. patent application Ser. No. 18/458,466 by CHEN et al., entitled "RANSOMWARE INFECTION DETECTION IN FILESYSTEMS" and filed Aug. 30, 2023, which is a Continuation of U.S. patent application Ser. No. 17/370,203 by CHEN et al., entitled "RANSOMWARE INFECTION DETECTION IN FILESYSTEMS" and filed Jul. 8, 2021 which is a Continuation of U.S. patent application Ser. No. 16/049,574 by CHEN et al., entitled "RANSOMWARE INFECTION DETECTION IN FILESYSTEMS" and filed Jul. 30, 2018, each of which is assigned to the assignee hereof, and each of which is expressly incorporated by reference herein.

BACKGROUND

1. Technical Field

The present invention generally relates to managing and storing data, and more specially relates to detecting ransomware infection in filesystems.

2. Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure. Another aspect is data portability across locations and platforms.

At the same time, ransomware has become a major cyber-security threat over the past few years. Signature-based ransomware detection is ineffective because ransomware can avoid detection by using different signatures. In addition, behavioral analysis based approaches tax computational resources. In any large organization with multiple disparate filesystems, protecting against ransomware invasion is a resource-consuming task.

SUMMARY

Described herein is a system that detects ransomware infection in filesystems. The system detects ransomware infection by using backup data of machines. The backup data of the machine records the filesystem's behavior. The system detects ransomware infection in two stages. In the first stage, the system analyzes a filesystem's behavior. The filesystem's behavior can be obtained by loading the backup data and crawling the filesystem to create a filesystem metadata. The filesystem metadata includes a list of entries including information about file operations that took place during a time interval. The filesystem determines a pattern of the file operations and compares the pattern to a normal patter to analyze the filesystem's behavior. If the filesystem's behavior is abnormal, the system proceeds to the second stage. In the second stage, the system analyzes the content of the files corresponding to the file operations to determine whether the files are encrypted. The system generates entropy features of the files and calculates an encryption score reflecting a probability of encryption in the filesystem. The system combines the analysis of both stages to determine an infection score reflecting a probability of ransomware infection in the filesystem. The infection score is an average of the abnormal score and the encryption score. The infection score is used to determine whether the filesystem is infected.

The system may employ machine learning models to analyze the filesystem's behavior as well as the content of the files. The machine learning models are trained by using data from different sources. The machine learning models are trained by using unsupervised training methods. A machine learning model detects anomalous filesystem behavior based on features that represent the filesystem's behavior. A machine learning model detects encryption in files based on entropy features that represent a level of randomness in file content.

Other aspects include components, devices, systems, improvements, methods, processes, applications, computer readable mediums, and other technologies related to any of the above.

BRIEF DESCRIPTION OF THE DRAWINGS

FIG. 4 is a block diagram of a virtual machine, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
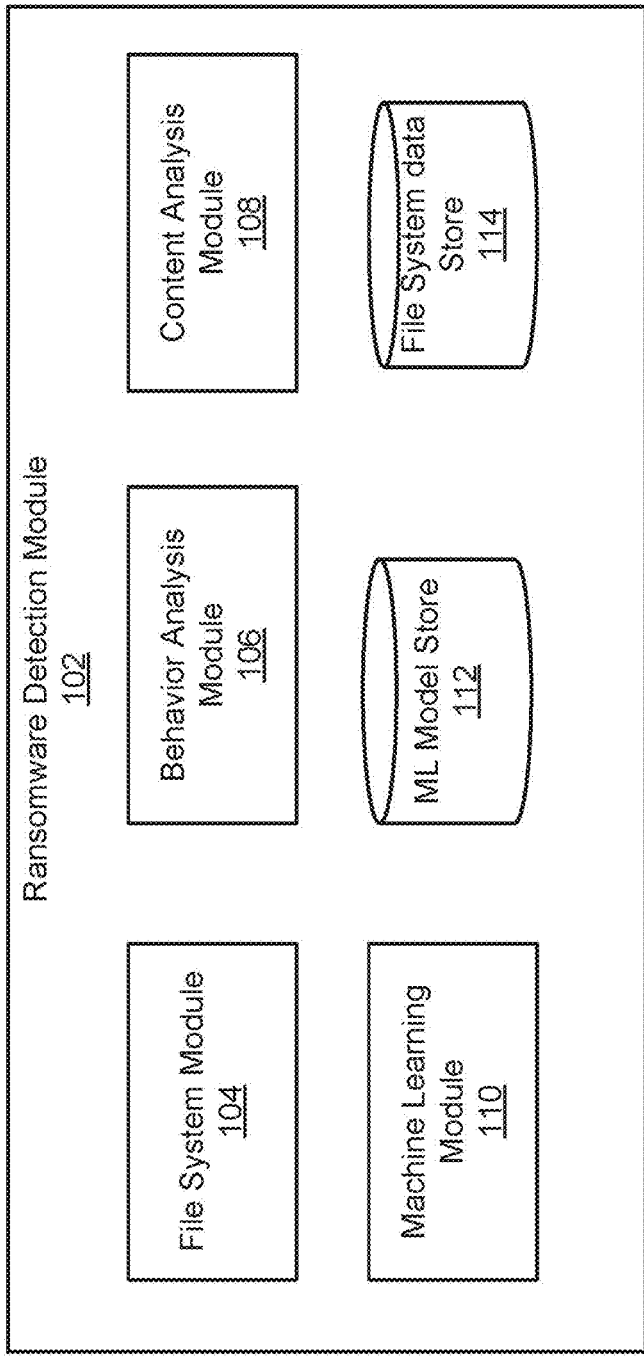
FIG. 1 is a block diagram of an example ransomware detection module for detecting ransomware infection in filesystems, according to one embodiment.

FIG. 1 illustrates an example ransomware detection module 102, according to one embodiment. The ransomware detection module 102 detects ransomware infection in a filesystem. The filesystem can reside on a virtual machine or a physical machine. As described herein, a machine can be physical or virtual unless specified. To detect whether a filesystem is infected by ransomware, the ransomware detection module 102 analyzes behavior the filesystem's behavior. The ransomware detection module 102 analyzes the filesystem's behavior by examining operations to files in the filesystem. If there is suspicious behavior, the ransomware detection module 102 analyzes the content of the files in the filesystem. Content of the files to which that have been operated is further analyzed to identify whether the files are encrypted. The ransomware detection module 102 can combine results of the behavior analysis and the content analysis to determine whether the filesystem is infected by ransomware.

The ransomware detection module 102 includes a filesystem module 104, a behavior analysis module 106, a content analysis module 108, a machine learning module 110, a machine learning model store 112, and a metadata store 114.

The filesystem module 104 interfaces with another system such as a virtual machine, a physical machine, or a data storage device to obtain data including content of a filesystem to be analyzed. As one example, the filesystem module 104 interfaces with a data store to obtain a snapshot of a machine. A snapshot can be used to restore a machine at a particular time point. The snapshot includes data of a machine at the particular time point. As another example, the filesystem module 104 interfaces with a machine to take a snapshot of the machine. From the snapshot, the filesystem module 104 records the changes in the filesystem during a time interval. The changes in the filesystem includes file operations that took place during the time interval. The file operations can be of different types corresponding to different operations applied to the files. Example file operations include a read operation, a write operation, a modify operation, an add operation, a move operation, a delete operation, a create operation, a rename operation, and the like. In some embodiments, the filesystem module 104 generates filesystem metadata of a filesystem of the machine, for example, by crawling the filesystem. The filesystem metadata includes a list of entries that correspond to filesystem changes during a time interval. The filesystem metadata describes the filesystem such as a structure of the filesystem and sizes of files in the filesystem.

The behavior analysis module 106 analyzes behavior of the filesystem during a time interval. The behavior analysis module 106 analyzes changes in the filesystem to analyze the behavior. For example, the behavior analysis module 106 analyzes the filesystem metadata that includes information about the changes in the filesystem in a time interval. The changes in the filesystem are results of operations that took place during the time interval. From the changes in the filesystem, the behavior analysis module 106 determines the operations that took place in the filesystem within the time interval. The behavior analysis module 106 examines a pattern of the file operations within a particular time interval relative to a pattern of the file operations throughout time to determine whether the behavior of the filesystem within the particular time interval is normal. If the pattern within a particular time period is abnormal, the behavior analysis module 106 provides the files corresponding to the file operations within the time interval to the content analysis module 108 for further analysis.

The behavior analysis module 106 may employ a machine learning model to examine whether the filesystem's behavior within a particular time interval is abnormal. From the metadata of the filesystem, the behavior analysis module 106 extracts behavior features that represent behaviors of the filesystem. The behavior features may be extracted from the filesystem metadata. Example behavior features include a number of file operations, a ratio of modify operations to file operations, a ratio of create operations to delete operations, a weighted-average ratio of delete operations across selected file types to all file types, a time difference, and the like. To determine the weighted-average ratio of delete operations across file types, the behavior analysis module 106 assigns a weight to delete operations applied to files of a particular file type. The weighted average ratio is the weighted sum of delete operations applied to files of the selected file types to the weighted sum of delete operations applied to files of all file types. For a particular filesystem, the behavior analysis module 106 also tracks an average ratio of create operations to delete operations over time. Based on the features, the machine learning model determines an abnormal score reflecting a probability of the filesystem's behavior being abnormal. The behavior features may be normalized before being provided to the machine learning model for further analysis.

In some embodiments, the machine learning model employs the k-nearest neighbors (KNN) algorithm that clusters the filesystem's behavior based on the behavior features. The machine learning model includes an ensemble of augmented KNN models. A KNN model clusters data into clusters according to multiple behavior features. The clusters correspond to different modes of filesystem usage and have qualitative interpretations of the data. The different KNN models are trained by using different data as further described below in connection with the machine learning module 110. In some embodiments, at least three KNN models are used. One KNN model is a general model that is trained by using filesystem data of different types of filesystems that are owned by different enterprises. A second KNN model is specific to an enterprise that is trained by using filesystem data of filesystems owned by the enterprise. A third KNN model is specific to a filesystem owned by an enterprise that is trained by using filesystem data of the filesystem. The ensemble model combines predictions of the KNN model by a weighted combination. A weight for a particular KNN model is learned by using the expectation-maximization algorithm during training as further described below in connection with the machine learning module 110.

The content analysis module 108 analyzes content of the files onto which were operated within the time period to determine whether any of the files is encrypted. The content analysis module 108 processes the content of the files to determine entropy features. An entropy feature represents a file's entropy that measures a randomness of the file. For each file that was operated during the time period, the content analysis module 108 determines an entropy value. The entropy features are created from the entropy values determined for the files. For example, the content analysis module 108 determines a total number of compressed files that are added or created in the filesystem, a total number of files that are created, a total number of files that are deleted, a total size change of the files, and the like. The content analysis module 108 further calculates an encryption score reflecting a degree of encryption in the filesystem. In some embodiments, the content analysis module 108 applies a Gaussian statistical model to the entropy features thereby to calculate the encryption score.

The machine learning module 110 generates one or more machine learning models used by the behavior analysis module 106 and the content analysis module 108. The machine learning models can include cluster analysis-based models, support vector machines, neural networks, deep learning models, or any combination thereof. In some embodiments, the machine learning module 110 applies unsupervised learning techniques such as density-based techniques (e.g., k-nearest neighbor, local outlier factor), hidden Markov models, Bayesian Networks, ensemble techniques, and the like. The machine learning models created by the machine learning module 110 can detect anomalies in training data. In some embodiments, the machine learning models created by the machine learning module 110 represent normal behavior from a given normal training data set. The machine learning models can be used to test the likelihood of a test instance to be generated by the machine learning model.

The machine learning module 110 creates machine learning models (e.g., determines the model parameters) by using training data. The training data includes filesystem metadata and files of filesystems. Some machine learning models are developed by using training data collected from different enterprises that are related to various types of filesystems and can be universally applicable to various enterprises. Some machine learning models are developed by using training data that includes data of different filesystems owned by a particular enterprise, and are applicable to the filesystems owned by the enterprise. Some machine learning models are developed by using training data that includes data of a particular filesystem owned by the particular enterprise, and are applicable to the particular filesystem of that particular enterprise. For ensemble models, the machine learning module 110 employs one or more expectation-maximization algorithms to determine weights corresponding to individual machine learning models to maximize the plausibility of the ensemble model's output given specific data. The machine learning module 110 stores the developed machine learning models in the machine learning model store 112.

The ransomware detection module 102 can be connected to the cloud and share computing resources with or from the cloud or store computing resources in the cloud. In one implementation, the behavior analysis module 106 provides filesystem metadata to the cloud for behavior analysis. This can save the local computing resource in the ransomware detection module 102. In some embodiments, the machine learning models can be trained and execute in a cloud. For example, in one implementation, the training performed by the machine learning module 110 is more computationally intensive, so it is cloud-based or occurs on a server with significant computing power. Once trained, the machine learning models can be distributed to the ransomware detection module 102, which can execute the machine learning model using fewer computing resources than is required for training.

Figure 2:
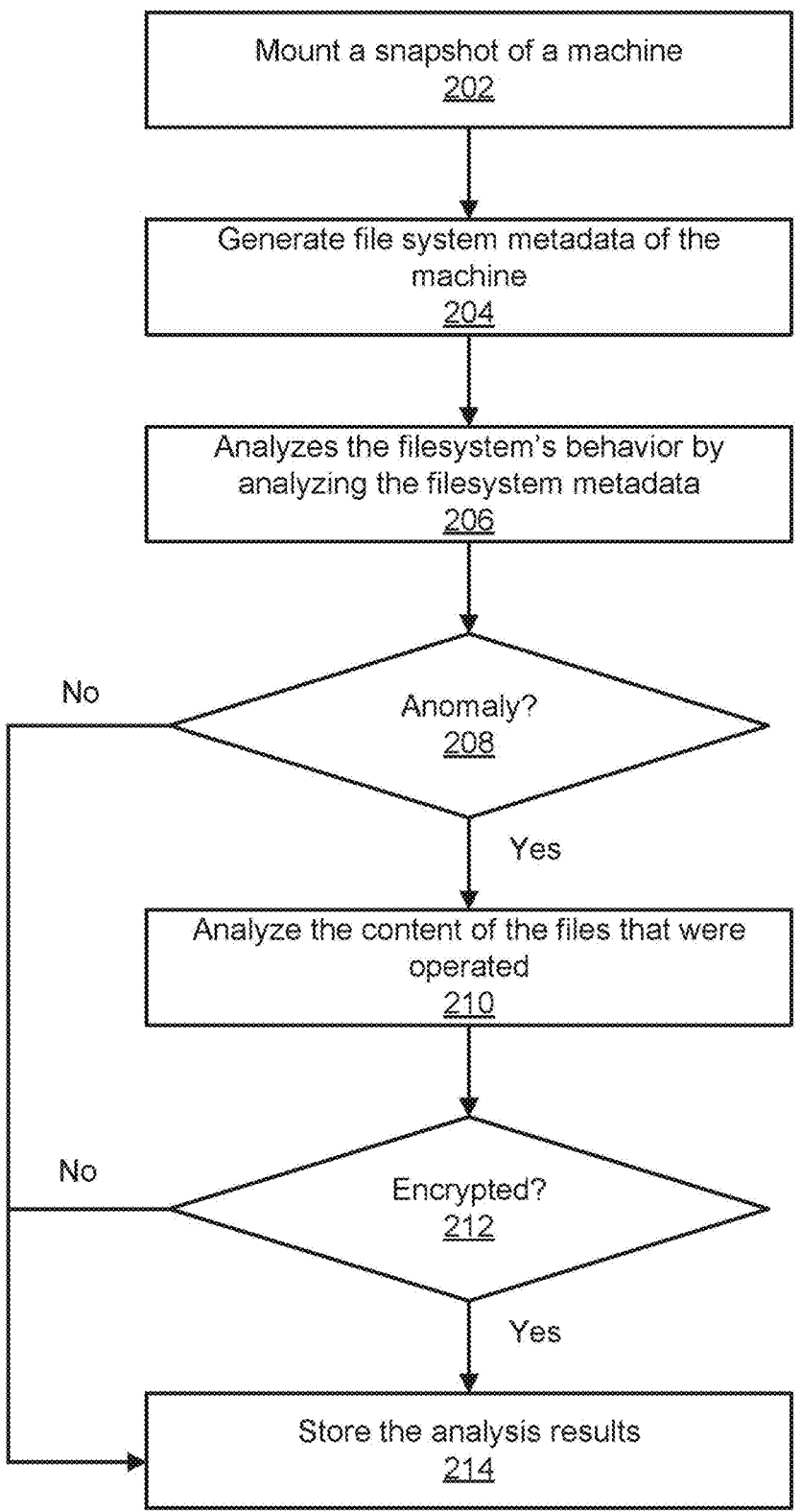
FIG. 2 is a flow chart illustrating an example process of detecting ransomware infection in filesystems, according to one embodiment.

FIG. 2 is a flow chart illustrating an example process of identifying ransomware infection in filesystems, according to one embodiment. The example process is described with an example of using backup data of machines to detect ransomware infection in filesystems of the machines. By using the backup data to detect infection, the ransomware infection detection does not affect the primary infrastructure that is analyzed because the ransomware detection module 102 is located separately from the primary infrastructure.

The ransomware detection module 102 mounts 202 a snapshot of a machine. The snapshot of the machine is a backup of data stored in the machine. The backup data records data changes in a filesystem on the machine during a time interval. The data changes include file operations within the time interval. The snapshot of the VM can include a full image or an incremental image of the machine. The full image of the machine captures all data stored on the machine at a particular time point. The incremental image of the machine captures data changes stored on the machine during a time interval. By mounting the snapshot of the machine, the ransomware detection module 102 loads data stored on the machine. The data loaded can be data stored on the machine at a particular time point if the snapshot is a full image corresponding to the particular time point, or can be data changes on the machine within a time interval if the snapshot is an incremental image corresponding to the time interval.

The ransomware detection module 102 generates 204 filesystem metadata of the machine. The filesystem metadata of the machine includes information about the data changes on the filesystem within the time interval. The ransomware detection module 102 crawls the filesystem to generate the filesystem metadata.

The ransomware detection module 102 analyzes 206 the filesystem's behavior by analyzing the data changes in the filesystem. For example, the ransomware detection module 102 analyzes the filesystem metadata. The filesystem's behavior includes file operations that took place in the filesystem within a time interval. To determine whether the filesystem's behavior is normal, the ransomware detection module 102 examines a pattern of the file operations that took place in the filesystem within the time interval. In some embodiments, the ransomware detection module 102 applies a machine learning model to the filesystem metadata to analyze the filesystem's behavior. The ransomware detection module 102 may calculate an abnormal score reflecting a probability of the filesystem's behavior being abnormal.

The ransomware detection module 102 compares 208 the pattern of the operations to a normal pattern to determine whether the filesystem's behavior is abnormal. For example, the ransomware detection module 102 compares the abnormal score to a threshold score to determine whether the filesystem's behavior is abnormal. If the abnormal score is above the threshold score, the ransomware detection module 102 concludes that the filesystem's behavior is abnormal. If the abnormal score does not exceed the threshold score, the ransomware detection module 102 concludes that the filesystem's behavior is normal. If the filesystem's behavior is normal, the ransomware detection module 102 stores the analysis results. In other implementations, the ransomware detection module 102 provides the filesystem's behavior to a cloud service for analysis.

If the filesystem's behavior is abnormal, the ransomware detection module 102 analyzes 210 the content of the files corresponding to the file operations during the time interval. The ransomware detection module 102 analyzes the content of the files to determine a level of encryption in the filesystem. For example, the ransomware detection module 102 calculates entropy features of the files and calculates an encryption score that indicates a probability of encryption in the filesystem. In some embodiments, the ransomware detection module 102 applies a machine learning model to the content of the files to analyze the filesystem's content. The entropy features measure measuring randomness of the files. The ransomware detection module 102 may combine the encryption score with the abnormal score to generate an infection score indicating an overall probability of ransomware-infection in the filesystem. The ransomware detection module 102 may remount the snapshot of the machine to analyze the content of the files.

The ransomware detection module 102 compares 212 the infection analysis results to a threshold infection level to determine whether the filesystem is infected with ransomware. For example, the ransomware detection module 102 compares the infection score to a threshold infection score. If the encryption score is above (or below) the threshold score, the ransomware detection module 102 concludes that the filesystem is infected (or not infected). The ransomware detection module 102 stores 214 the analysis results.

The ransomware detection module 102 generates and presents user interfaces for presenting the determination to users. In some embodiments, the ransomware detection module 102 generates the user interface if determining that the filesystem is infected.

The ransomware detection module illustrated in FIG. 1 detects ransomware infection in filesystems, according to one embodiment. The example personal data processing module can detect ransomware infection in a compute infrastructure 302 as illustrated in FIG. 3.

Figure 3:
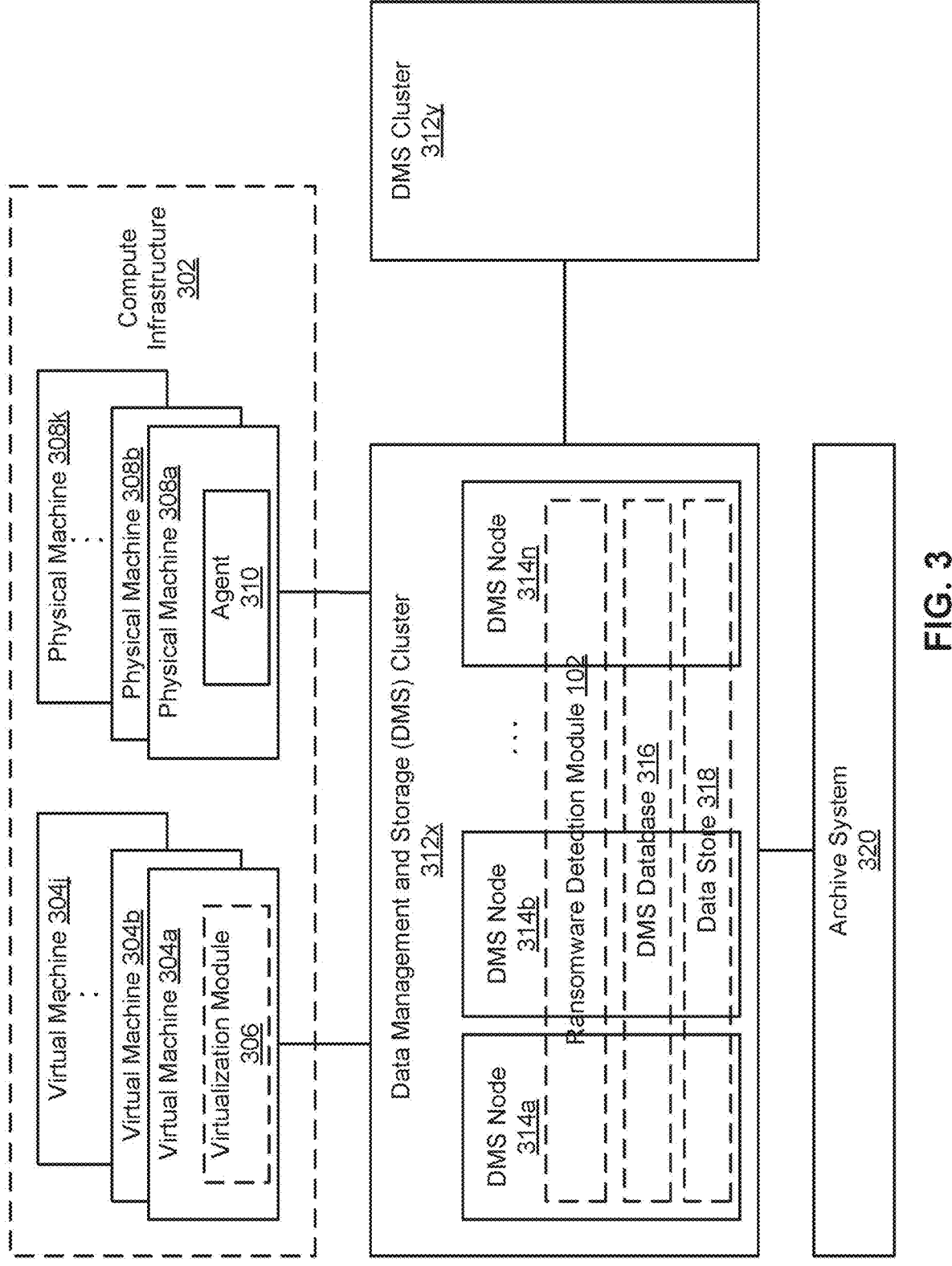
FIG. 3 is a block diagram of a system for managing and storing data, according to one embodiment.

In more detail, FIG. 3 is a block diagram illustrating a system for managing and storing data, according to one embodiment. The system includes a data management and storage (DMS) cluster 312*x*, a secondary DMS cluster 312*y* and an archive system 320. The DMS system provides data management and storage services to a compute infrastructure 302, which may be used by an enterprise such as a corporation, university, or government agency. Many different types of compute infrastructures 302 are possible. Some examples include serving web pages, implementing e-commerce services and marketplaces, and providing compute resources for an enterprise's internal use. A specific example is a compute infrastructure for serving a web application, which is powered by a web server running on a VM and a SQL database. Another example is an NFS share with legal documents for a law firm that is continuously versioned. The compute infrastructure can include production environments, in addition to development or other environments.

In this example, the compute infrastructure 302 includes both virtual machines (VMs) 304*a-j* and physical machines (PMs) 308*a-k*. The VMs 304 can be based on different hypervisors. VMWARE, MICROSOFT HYPER V, MICROSOFT AZURE, GCP (Google Cloud Platform), NUTANIX AHV, LINUX KVM (Kernel-based Virtual Machine), and XEN are some examples. The physical machines 308*a-n* can also use different operating systems running various applications. MICROSOFT WINDOWS running MICROSOFT SQL or ORACLE databases, and LINUX running web servers are some examples.

The DMS cluster 312 manages and stores data for the compute infrastructure 302. This can include the states of machines 304,308, configuration settings of machines 304, 308, network configuration of machines 304,308, data stored on machines 304,308, and corresponding metadata. Example DMS services includes backup, recovery, replication, archival, and analytics services. The primary DMS cluster 312*x* enables near instant recovery of backup data. Derivative workloads (e.g., testing, development, and analytic workloads) may also use the DMS cluster 312*x* as a primary storage platform to read and/or possibly modify past versions of data. The DMS cluster 312 also processes personal data stored in the compute infrastructure 302.

In this example, to provide redundancy, two DMS clusters 312*x-y* are used. From time to time, data stored on DMS cluster 312*x* is replicated to DMS cluster 312*y*. If DMS cluster 312*x* fails, the DMS cluster 312*y* can be used to provide DMS services to the compute infrastructure 302 with minimal interruption.

Archive system 320 archives data for the computer infrastructure 302. The archive system 320 may be a cloud service. The archive system 320 receives data to be archived from the DMS clusters 312. The archived storage typically is "cold storage," meaning that more time is required to retrieve data stored in archive system 320. In contrast, the DMS clusters 312 provide much faster backup recovery.

The following examples illustrate operation of the DMS cluster 312 for backup and recovery of VMs 304. This is used as an example to facilitate the description. The same principles apply also to PMs 308 and to other DMS services.

Each DMS cluster 312 includes multiple peer DMS nodes 314*a-n* that operate autonomously to collectively provide the DMS services, including managing and storing data. A DMS node 314 includes a software stack, processor and data storage. DMS nodes 314 can be implemented as physical machines and/or as virtual machines. The DMS nodes 314 are interconnected with each other, for example, via cable, fiber, backplane, and/or network switch. The end user does not interact separately with each DMS node 314, but interacts with the DMS nodes 314*a-n* collectively as one entity, namely, the DMS cluster 312.

Preferably, the DMS nodes 314 are peers and each DMS node 314 includes the same functionality. The DMS cluster 312 automatically configures the DMS nodes 314 as new nodes are added or existing nodes are dropped or fail. In this way, the computing power and storage capacity of the DMS cluster 312 is scalable by adding more nodes 314.

The DMS cluster 312 includes the ransomware detection module 102, a DMS database 316, and a data store 318. The functionality of the ransomware detection module 102 is distributed across the nodes 314. For example, each DMS nodes includes software stacks that include a job scheduler, a job engine, and a user interface; and the DMS database 116 includes data structures that include at least a job queue.

The job schedulers create jobs to be processed by the job engines. These jobs are posted to the job queue. Example jobs include detect ransomware infection in filesystems, pull snapshots (take a snapshot of a machine), mount snapshots, generate filesystem metadata, perform behavior analysis of the filesystem, perform content analysis of the filesystem, replicate (to the secondary DMS cluster), and archive, etc. The jobs can be determined according to the service schedule or the DMS cluster's operation separate from the service schedule.

The user interface allows users to interact with the DMS cluster 312. Preferably, each of the DMS nodes includes a user interface, and any of the user interfaces can be used to access the DMS cluster 312. This way, if one DMS node fails, any of the other nodes can still provide a user interface. The user interface can be used to define what services should be performed at what time for which machines in the compute infrastructure (e.g., the frequency of backup for each machine in the compute infrastructure). The user interface can also be used to allow the user to run ransomware infection analysis or other diagnostics (reports or analytics) and to review analysis results.

The software stack also includes other interfaces such as an interface to the computer infrastructure 302, through which the DMS nodes 312 may make requests to the virtualization module 306 and/or the agent 310. In one implementation, the VM 304 can communicate with a DMS node 314 using a distributed filesystem protocol (e.g., Network File System (NFS) Version 3) via the virtualization module 306. The distributed filesystem protocol allows the VM 304 to access, read, write, or modify files stored on the DMS node 312 as if the files were locally stored on the physical machine supporting the VM 304. The distributed filesystem protocol also allows the VM 304 to mount a directory or a portion of a filesystem located within the DMS node 314. There are also interfaces to the DMS database 316 and the data store 318, as well as network interfaces such as to the secondary DMS cluster 312*y* and to the archive system 320.

The DMS database 316 stores data structures used in providing the DMS services. The DMS database 316 and the data store 318 may store data in tables but other data structures could also be used. The data store 318 contains the actual backup data from the compute infrastructure 302, for example snapshots of VMs or application files. Both the DMS database 316 and the data store 318 are distributed across the nodes 314, for example using Apache Cassandra and Atlas. That is, the DMS database 316 in its entirety is not stored at any one DMS node 314. Rather, each DMS node 314 stores a portion of the DMS database 316 but can access the entire DMS database. Data in the DMS database 316 preferably is replicated over multiple DMS nodes 314 to increase the fault tolerance and throughput, to optimize resource allocation, and/or to reduce response time. In one approach, each piece of data is stored on at least three different DMS nodes. The data store 318 has a similar structure, although data in the data store may or may not be stored redundantly. Accordingly, if any DMS node 314 fails, the full DMS database 316 and the full functionality of the DMS cluster 312 will still be available from the remaining DMS nodes. As a result, the DMS services can still be provided.

Considering each of the other components shown in FIG. 3, a virtual machine (VM) 304 is a software simulation of a computing system. The virtual machines 304 each provide a virtualized infrastructure that allows execution of operating systems as well as software applications such as a database application or a web server. A virtualization module 306 resides on a physical host (i.e., a physical computing system) (not shown), and creates and manages the virtual machines 304. The virtualization module 306 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 306 provides an interface for other computing devices to interface with the virtualized infrastructure. In the following example, the virtualization module 306 is assumed to have the capability to take snapshots of the VMs 304. An agent could also be installed to facilitate DMS services for the virtual machines 304.

A physical machine 308 is a physical computing system that allows execution of operating systems as well as software applications such as a database application or a web server. In the following example, an agent 310 is installed on the physical machines 308 to facilitate DMS services for the physical machines.

The components shown in FIG. 3 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 3 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

FIG. 4 is a block diagram of a server for a VM platform, according to one embodiment. The server includes hardware-level components and software-level components. The hardware-level components include one or more processors 482, one or more memory 484, and one or more storage devices 485. The software-level components include a hypervisor 486, a virtualized infrastructure manager 499, and one or more virtual machines 498. The hypervisor 486 may be a native hypervisor or a hosted hypervisor. The hypervisor 486 may provide a virtual operating platform for running one or more virtual machines 498. Virtual machine 498 includes a virtual processor 492, a virtual memory 494, and a virtual disk 495. The virtual disk 495 may comprise a file stored within the physical disks 485. In one example, a virtual machine may include multiple virtual disks, with each virtual disk associated with a different file stored on the physical disks 485. Virtual machine 498 may include a guest operating system 496 that runs one or more applications, such as application 497. Different virtual machines may run different operating systems. The virtual machine 498 may load and execute an operating system 496 and applications 497 from the virtual memory 494. The operating system 496 and applications 497 used by the virtual machine 498 may be stored using the virtual disk 495. The virtual machine 498 may be stored as a set of files including (a) a virtual disk file for storing the contents of a virtual disk and (b) a virtual machine configuration file for storing configuration settings for the virtual machine. The configuration settings may include the number of virtual processors 492 (e.g., four virtual CPUs), the size of a virtual memory 494, and the size of a virtual disk 495 (e.g., a 10 GB virtual disk) for the virtual machine 495.

The virtualized infrastructure manager 499 may run on a virtual machine or natively on the server. The virtualized infrastructure manager 499 corresponds to the virtualization module 106 above and may provide a centralized platform for managing a virtualized infrastructure that includes a plurality of virtual machines. The virtualized infrastructure manager 499 may manage the provisioning of virtual machines running within the virtualized infrastructure and provide an interface to computing devices interacting with the virtualized infrastructure. The virtualized infrastructure manager 499 may perform various virtualized infrastructure related tasks, such as cloning virtual machines, creating new virtual machines, monitoring the state of virtual machines, and facilitating backups of virtual machines.

Figure 5:
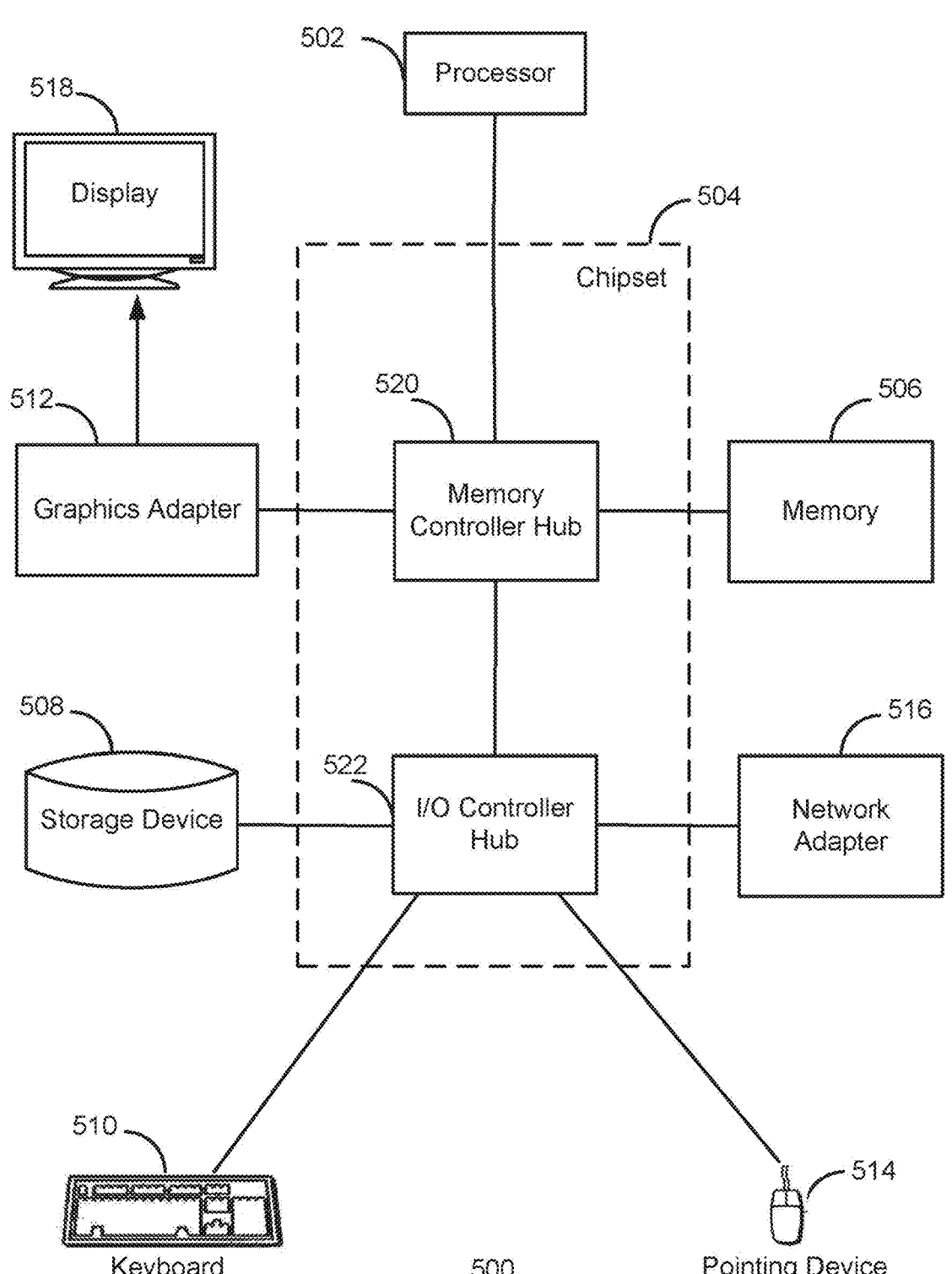
FIG. 5 is a block diagram of a computer system suitable for use in a DMS system, according to one embodiment.

FIG. 5 is a high-level block diagram illustrating an example of a computer system 500 for use as one or more of the components shown above, according to one embodiment. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds instructions and data used by the processor 502. The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to a network. Some embodiments of the computer 500 have different and/or other components than those shown in FIG. 5. For example, the virtual machine 304, the physical machine 308, and/or the DMS node 314 in FIG. 3 can be formed of multiple blade servers and lack a display device, keyboard, and other components.

The computer 500 is adapted to execute computer program modules for providing functionality described herein.

As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method, comprising:
accessing a data store to obtain a first set of snapshots corresponding to a machine, each snapshot indicating data of the machine at a corresponding point in time, the first set of snapshots comprising a plurality of snapshots spanning a period of time;
generating metadata indicating operations to one or more files in a filesystem of the machine over time intervals corresponding to the first set of snapshots;
training, using the metadata, a ransomware detection model operative to define a normal pattern of behavior of the filesystem and to detect an infection of the filesystem of the machine by ransomware, wherein the ransomware detection model comprises a first model feature that is based at least in part on the metadata corresponding to the first set of snapshots, and wherein the ransomware detection model further comprises a second model feature that is based at least in part on respective entropies of the one or more files in the filesystem of the machine;
receiving, by the ransomware detection model, a second snapshot of the machine, the second snapshot indicating data of the machine at a corresponding point in time subsequent to the first set of snapshots, wherein the second snapshot indicates operations to one or more files in the filesystem of the machine over a second time interval;
applying the ransomware detection model to the second snapshot to screen for abnormal behavior of the filesystem, wherein the ransomware detection model is operative to assess changes in the filesystem over the second time interval and entropies of one or more files in the filesystem associated with the second time interval, wherein the ransomware detection model is further operative to calculate one or more scores indicating a respective probability that a behavior of the filesystem is anomalous;
comparing the one or more scores to a respective threshold value;
based at least in part on at least one of the one or more scores crossing the respective threshold value, generating a user interface for presenting a determination that the filesystem is infected; and
providing the user interface for display.

2. The method of claim 1, wherein the machine is a virtual machine.

3. The method of claim 1, wherein the changes in the filesystem are recorded in the metadata, the metadata including a list of entries corresponding to data changes in the filesystem.

4. The method of claim 1, wherein the period of time comprises a plurality of time intervals corresponding to the first set of snapshots and wherein the period of time is greater than the second time interval.

5. The method of claim 1, wherein the ransomware detection model is operative to generate a combined anomaly score by combining the one or more scores.

6. The method of claim 1, further comprising:
training the ransomware detection model using additional training data, the additional training data including at least one of filesystem data of filesystems owned by multiple users, and filesystem data of multiple filesystems owned by a user.

7. The method of claim 1, wherein the training of the ransomware detection model is performed in a cloud platform.

8. The method of claim 1, wherein the ransomware detection model is hosted in a cloud platform.

9. The method of claim 1, wherein the ransomware detection model comprises a first machine learning model and a second machine learning model, wherein the first machine learning model includes the first model feature and is operative to determine whether the behavior of the filesystem is anomalous, wherein the second machine learning model includes the second model feature and is operative to detect a ransomware encryption event.

10. The method of claim 9, wherein the ransomware detection model applies the second machine learning model to the second snapshot when the first machine learning model identifies that the filesystem behavior of the machine is anomalous.

11. An apparatus for data management, comprising:
at least one processor;
memory coupled with the at least one processor; and
instructions stored in the memory and executable by the at least one processor to cause the apparatus to perform operations comprising:
accessing a data store to obtain a first set of snapshots corresponding to a machine, each snapshot indicating data of the machine at a corresponding point in time, the first set of snapshots comprising a plurality of snapshots spanning a period of time;
generating metadata indicating operations to one or more files in a filesystem of the machine over time intervals corresponding to the first set of snapshots;
training, using the metadata, a ransomware detection model operative to define a normal pattern of behavior of the filesystem and to detect an infection of the filesystem of the machine by ransomware, wherein the ransomware detection model comprises a first model feature that is based at least in part on the metadata corresponding to the first set of snapshots, and wherein the ransomware detection model further comprises a second model feature that is based at least in part on respective entropies of the one or more files in the filesystem of the machine;
receiving, by the ransomware detection model, a second snapshot of the machine, the second snapshot indicating data of the machine at a corresponding point in time subsequent to the first set of snapshots, wherein the second snapshot indicates operations to one or more files in the filesystem of the machine over a second time interval;
applying the ransomware detection model to the second snapshot to screen for abnormal behavior of the filesystem, wherein the ransomware detection model is operative to assess changes in the filesystem over the second time interval and entropies of one or more files in the filesystem associated with the second time interval, wherein the ransomware detection model is further operative to calculate one or more scores indicating a respective probability that a behavior of the filesystem is anomalous;

comparing the one or more scores to a respective threshold value;

based at least in part on at least one of the one or more scores crossing the respective threshold value, generating a user interface for presenting a determination that the filesystem is infected; and providing the user interface for display.

12. The apparatus of claim 11, wherein the machine is a virtual machine.

13. The apparatus of claim 11, wherein the changes in the filesystem are recorded in the metadata, the metadata including a list of entries corresponding to data changes in the filesystem.

14. The apparatus of claim 11, wherein the period of time comprises a plurality of time intervals corresponding to the first set of snapshots and wherein the period of time is greater than the second time interval.

15. The apparatus of claim 11, wherein the ransomware detection model is operative to generate a combined anomaly score by combining the one or more scores.

16. The apparatus of claim 11, the operations further comprising:

training the ransomware detection model using additional training data, the additional training data including at least one of filesystem data of filesystems owned by multiple users, and filesystem data of multiple filesystems owned by a user.

17. The apparatus of claim 11, wherein the training of the ransomware detection model is performed in a cloud platform.

18. The apparatus of claim 11, wherein the ransomware detection model is hosted in a cloud platform.

19. The apparatus of claim 11, wherein the ransomware detection model comprises a first machine learning model and a second machine learning model, wherein the first machine learning model includes the first model feature and is operative to determine whether the behavior of the filesystem is anomalous, wherein the second machine learning model includes the second model feature and is operative to detect a ransomware encryption event.

20. The apparatus of claim 19, wherein the ransomware detection model applies the second machine learning model to the second snapshot when the first machine learning model identifies that the filesystem behavior of the machine is anomalous.

* * * * *